Dec. 14, 1943.    W. A. UPRIGHT    2,336,761
SAW SET AND JOINTER
Filed Sept. 29, 1942    2 Sheets-Sheet 1
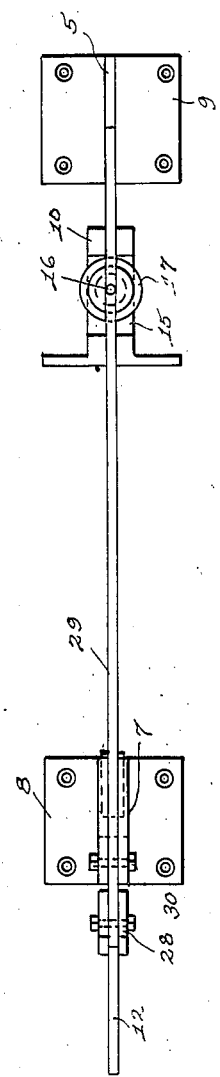
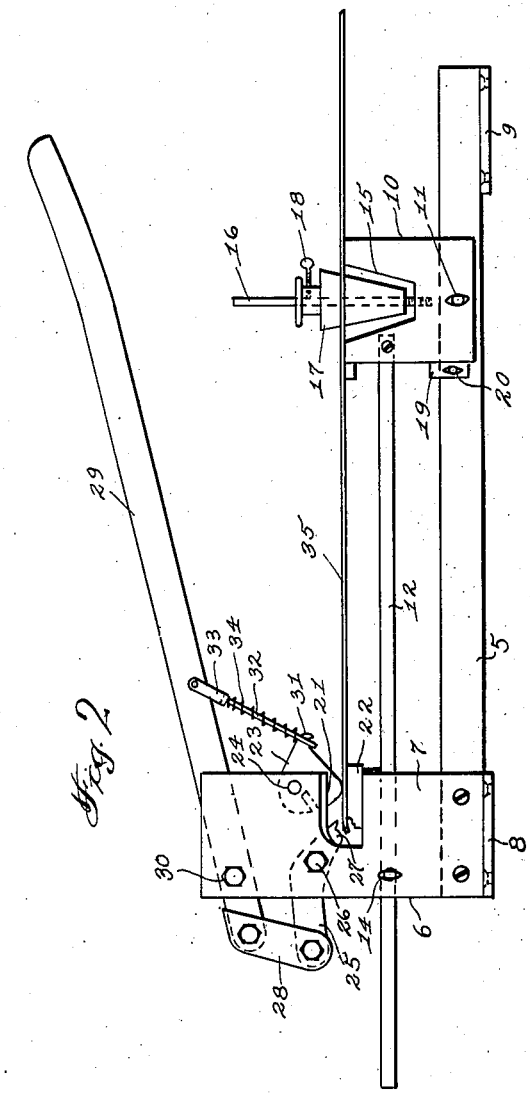
INVENTOR.
Warren A. Upright
BY Ralph Burch

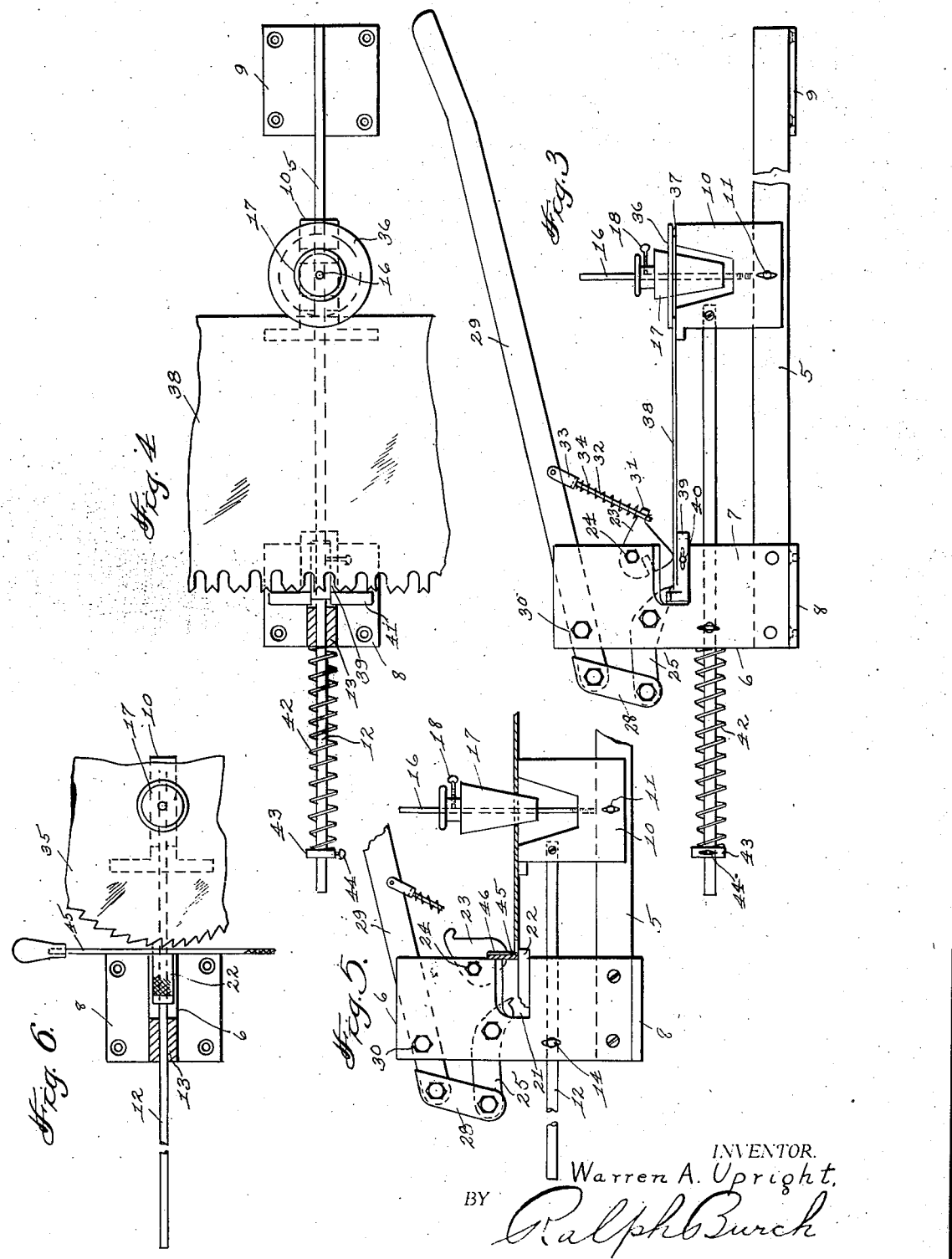

Patented Dec. 14, 1943

2,336,761

UNITED STATES PATENT OFFICE 2,336,761

SAW SET AND JOINTER

Warren A. Upright, Highland, Calif.

Application September 29, 1942, Serial No. 460,154

2 Claims. (Cl. 76—63)

This invention relates to an improved saw set and jointer and has for its object to provide a device which may be efficiently employed in setting the teeth of both straight and circular saws.

A further object of the invention resides in providing a device which may be readily adjusted to accommodate saws of different sizes and which will accurately and uniformly set the teeth at the desired set.

Another object of the invention resides in providing a device of the above-mentioned character which is simple and durable in construction, reliable and efficient in operation and inexpensive to manufacture.

Other objects and advantages of the invention will be apparent during the course of the following description.

In the accompanying drawings forming a part of this specification and in which like numerals are employed to designate like parts throughout the same, Fig. 1 is a top plan view of the device, Fig. 2 is a side elevation of the same, Fig. 3 is a side elevation view of the device with slight additions for use in connection with straight saws, Fig. 4 is a top plan view, partly in section, of the device as shown in Fig. 3, Fig. 5 is a side elevation of the device showing the position of the parts when used as a jointer, and, Fig. 6 is a top plan view, partly in section, of the device shown in Fig. 5.

Referring to the drawings wherein for the purpose of illustration I have shown a preferred embodiment of my invention, the numeral 5 denotes a longitudinal slide bar having one end secured in the lower end of a vertical stand 6 composed of spaced parallel plates 7 having lateral flanges 8 at their lower ends for attaching the stand to a suitable base. The opposite end of the bar 5 is attached to a base plate 9 which likewise is secured to the base. A work rest 10 is slidably mounted on the bar 5 and is secured in its adjusted position by a set screw 11. A guide rod 12 has one end fixedly attached to the rest 10 with its opposite end slidably mounted in a bearing 13 extending through the stand 6 and a set screw 14 mounted in the side of the stand secures the guide rod in adjusted position. The top of the work rest 10 is provided with a conical recess 15 having a vertical spindle 16 disposed in the center thereof on which a cone 17 is slidably and rotatably mounted. A set screw 18 carried by the cone is adapted to engage the spindle to secure the cone in fixed position. A stop yoke 19 is adjustably secured on the slide bar 5 by a set screw 20 to be used to gauge the setting of the work rest when reversing the saw being set.

The stand 6 has one of its vertical edges recessed, as at 21, to receive an anvil 22 and disposed above the anvil is a cam 23 eccentrically mounted between the plates 7 by a pivot pin 24. A dog 25 is pivotally mounted between the plates 7 by a bolt 26 and the end 27 of the dog is designed for co-acting with the edge of the anvil to bend the teeth of the saw. The free end of the dog extends beyond the stand and is pivotally connected by a link 28 to the end of an operating lever 29. The operating lever is pivotally mounted between the plates 7 by a bolt 30 and extends a substantial distance beyond the stand to provide the necessary leverage for actuating the dog. The cam 23 is provided with an apertured lug 31 to slidably receive one end of a rod 32 pivotally connected at its opposite end to the lever 29 by a yoke 33 and a coil spring 34 mounted on the rod exerts a pressure on the cam when the lever 29 is depressed to move the cam into binding engagement with the work to hold it in fixed position on the anvil while the dog 25 is bending the teeth.

When setting the teeth of a circular saw, the saw 35 is placed upon the rest 10 with its central opening alined with the recess 15 and then the cone 17 is adjusted on the spindle 16 to fixedly secure the saw in position. The rest 10 is then adjusted longitudinally of the bar 5 to position the peripheral edge of the saw in proper relation to the edge of the anvil 22, whereupon the rest is secured in fixed position by tightening the set screws 11 and 14. When the saw is in position the operating lever 29 is pressed downwardly which causes the cam 23 to engage the saw and hold it firmly upon the anvil while the dog 25 is bending or setting the teeth.

In Figs. 3 and 4 a slightly modified form of the device is shown which is used to set the teeth of straight saws. In this form of the device a clamping plate 36 is mounted on top of the rest 10 having a central opening to receive the cone 17 which secures the plate in position. The edge of the clamping plate is rabbeted, as at 37, to receive the edge of the straight saw 38 and the toothed edge of the saw rests on the anvil 22. A U-shaped yoke 39 straddles the anvil and is adjustably attached thereto by a set screw 40. The ends of the yoke are provided with off-set lateral arms 41 which serve to aline the teeth of the saw.

A coil spring 42 is mounted on the extended end of the guide rod 12 being disposed between the stand 6 and collar 43 adjustably secured on the guide rod by a set screw 44. The expansion of the spring 42 draws the rest 10 towards the stand 6 and thus holds the teeth of the saw blade in contact with the arms 41 of the yoke 39.

In Figs. 5 and 6 I have illustrated how the device may be used as a jointer. A file 45 is placed within a notch 46 in the edge of the cam 23 and the cam is adjusted to hold the file in a vertical plane on top of the anvil, as shown in Fig. 5. The circular saw 35 is mounted on the rest 10 with the teeth of the saw in contact with the file. After tightening the set screws 11 and 14 the saw is rotated on the cone 17 whereby the teeth are filed to the same length and the saw is perfectly round.

It is to be understood that the forms of my invention herein shown and described are to be considered as preferred examples of the same and that certain changes in the shape, size and arrangement of the parts may be made without departing from the spirit of the invention or the scope of the subjoined claims.

Having thus described my invention, I claim:

1. A device of the character described comprising a stand, a rotatable disk member mounted on a horizontal pivot in said stand having a notch in its peripheral edge, a file adapted to be inserted in the notch of said disk member and moved against said stand upon rotation of said member whereby said file is held in a fixed vertical plane, and a saw rest for rotatably supporting a saw in a horizontal plane and adjustable to move said saw in a horizontal plane to bring the saw teeth into contact with said file.

2. A device of the character described comprising a stand having a vertical slot, a disk member rotatably mounted in said slot to partly project from said stand, said disk having a notch in its peripheral edge, a file adapted to be inserted in the notch of said disk member and moved against said stand upon rotation of said member whereby said file is held in a fixed vertical plane, a saw rest for rotatably supporting a saw in a horizontal plane, and yieldable means for adjusting said rest to hold the teeth of the saw in operative contact with said file.

WARREN A. UPRIGHT.